US008335757B2

(12) United States Patent
Su et al.

(10) Patent No.: US 8,335,757 B2
(45) Date of Patent: Dec. 18, 2012

(54) EXTRACTING PATTERNS FROM SEQUENTIAL DATA

(75) Inventors: Jie Su, Beijing (CN); Min Chu, Beijing (CN); Wenli Zhu, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 12/359,343

(22) Filed: Jan. 26, 2009

(65) Prior Publication Data

US 2010/0191753 A1 Jul. 29, 2010

(51) Int. Cl.
  G06F 7/00 (2006.01)
  G06F 17/30 (2006.01)
(52) U.S. Cl. .......................... 707/602; 706/21
(58) Field of Classification Search .................. 707/602, 707/776
See application file for complete search history.

(56) References Cited

U.S. PATENT DOCUMENTS

| | | | |
|---|---|---|---|
| 5,983,180 A | 11/1999 | Robinson | |
| 6,108,714 A * | 8/2000 | Kumagai et al. | 719/310 |
| 6,473,757 B1 | 10/2002 | Garofalakis | |
| 6,785,663 B2 | 8/2004 | Wang et al. | |
| 7,188,340 B2 | 3/2007 | Ostertag et al. | |
| 7,508,985 B2 | 3/2009 | Van Lunteren | |
| 7,877,401 B1 * | 1/2011 | Hostetter et al. | 707/758 |
| 2003/0229471 A1 | 12/2003 | Guralnik et al. | |
| 2004/0024773 A1 * | 2/2004 | Stoffel et al. | 707/102 |
| 2004/0044528 A1 * | 3/2004 | Chelba et al. | 704/249 |
| 2005/0005242 A1 * | 1/2005 | Hoyle | 715/745 |
| 2005/0071465 A1 | 3/2005 | Zeng et al. | |
| 2006/0279546 A1 * | 12/2006 | Karmazyn | 345/168 |
| 2007/0113170 A1 | 5/2007 | Dignum et al. | |
| 2009/0271720 A1 * | 10/2009 | Deshpande et al. | 715/764 |
| 2010/0191693 A1 | 7/2010 | Su | |

FOREIGN PATENT DOCUMENTS

WO 2006076760 A1 7/2006

OTHER PUBLICATIONS

Rabiner, An Introduction to Hidden Markov Models, 1986, pp. 4-16.*
Chen, Mining Frequent tree-like patterns in large datasets, 2006, pp. 65-83.*
El-Ramly, Mining Software Usage Data, 2004, Proceedings 1st International Workshop on Mining Software Repositories pp. 64-68.*

(Continued)

Primary Examiner — Rehana Perveen
Assistant Examiner — Albert Phillips, III (57) ABSTRACT

Described is a technology in which sequential data, such as application program command sequences, are processed into patterns, such as for use in analyzing program usage. In one aspect, sequential data may be first transformed via state machines that remove repeated data, group similar data into sub-sequences, and/or remove noisy data. The transformed data is then segmented into units. A pattern extraction mechanism extracts patterns from the units into a pattern set, by calculating a stability score (e.g., a mutual information score) between succeeding units, selecting the pair of units having the most stability (e.g., the highest score), and adding corresponding information for that pair into the pattern set. Pattern extraction is iteratively repeated until a stopping criterion is met, e.g., the pattern set reaches a defined size, or when the stability score is smaller than a pre-set threshold.

19 Claims, 4 Drawing Sheets

OTHER PUBLICATIONS

McCallum, at al., "Maximum Entropy Markov Models for Information Extraction and Segmentation", retrieved at << http://www.cs.iastate.edu/~honavar/memm-icml2000.pdf >>, 2000, pp. 8.

Lafferty, et al., "Conditional Random Fields: Probabilistic Models for Segmenting and Labeling Sequence Data", retrieved at << http://l2r.cs.uiuc.edu/~danr/Teaching/CS598-05/Papers/crf.pdf >>, pp. 8.

Gurevich, Yuri, "Sequential Abstract State Machines Capture Sequential Algorithms", retrieved at << http://research.microsoft.com/users/gurevich/Opera/141.pdf >>, pp. 32.

Bourlard, et al., "Hidden Markov Models and other Finite State Automata for Sequence Processing", retrieved at << http://www.idiap.ch/~bengio/cv/publications/pdf/handbook_2002.pdf >>, appeared in The Handbook of Brain Theory and Neural Networks, Second edition, (M.A. Arbib, Ed.), Cambridge, MA: The MIT Press, 2002, pp. 16.

Hong, P. et al.; "Constructing Finite State Machines for Fast Gesture Recognition"; Proceedings 15th ICPR; 2000; pp. 3695-3698.

Chang, C.-H. et al.; "IEPAD: Information Extraction based on Pattern Discovery"; Proceedings of the 10th International Conference on World Wide Web; Hong Kong; May 2-5, 2001; pp. 223-231.

Garofalakis, M. et al.; "Spirit: Sequential Pattern Mining with Regular Expression Constraints"; Proceedings of the 25th VLDB Conference; Edinburgh, Scotland; 1999.

Liu, J. et al.; "Similarity Comparison and Analysis of Sequential Data"; Proceedings of International Conference on Expert Systems for Development; Bangkok, Thailand; Mar. 28-31, 1994; pp. 138-143.

Conrad, G. et al.; "Pattern Discovery in Time-Ordered Data"; Sandia National Laboratories Report SAND2002-0245; Albuquerque, New Mexico; Feb. 2002.

* cited by examiner

EXTRACTING PATTERNS FROM SEQUENTIAL DATA

CROSS REFERENCE TO RELATED APPLICATION

This patent application is related to U.S. patent application Ser. No. 12/359,344 filed concurrently herewith, and hereby incorporated by reference.

BACKGROUND

Discovery of sequential patterns is becoming increasingly useful and valuable in many scientific and commercial applications. Consider for example a Microsoft® Office command sequence. It is valuable information for Microsoft Corporation's developers and support personnel to know how the product is used, such as to know the answer to "What other features are used before or after feature X?" or "What do users do after they visit help?" or "Is feature X easy to find?" (which corresponds to knowing how many clicks are needed in order to execute command X).

However, there are vast numbers of such patterns in these and other scientific and commercial applications. The main challenge of pattern mining is how to automatically obtain meaningful patterns from very large sets of data.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which sequential data is processed into patterns, such as for use in analyzing program usage. In one aspect, sequential data may be first transformed by removing repeated data, grouping similar data into sub-sequences, and/or removing noisy data. One or more finite state machines may be used perform the data transformation or transformations.

The sequential data, which may have been transformed data, is segmented into units. A pattern extraction mechanism extracts patterns from the units into a pattern set. This may be performed by calculating a stability score between succeeding units, such as a mutual information score, selecting the pair of units having the most stability (e.g., the highest mutual information score), and adding corresponding information for that pair into the pattern set. The pattern extraction is iteratively repeated until a stopping criterion is met, e.g., the pattern set reaches a defined size, when the stability score is smaller than a pre-set threshold, and so forth.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an automatic pattern extraction mechanism and method which aim to identify stable usage patterns from sequential data, in which the patterns are straightforward to interpret. In one implementation, data transformation is performed with a finite state machine. An iterative algorithm extracts stable patterns in sequential data, and pattern extraction is performed on high-level units constructed from original sequences.

While Microsoft® Office commands and the like are used to exemplify command sequence analysis, it should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data processing in general.

Figure 1:
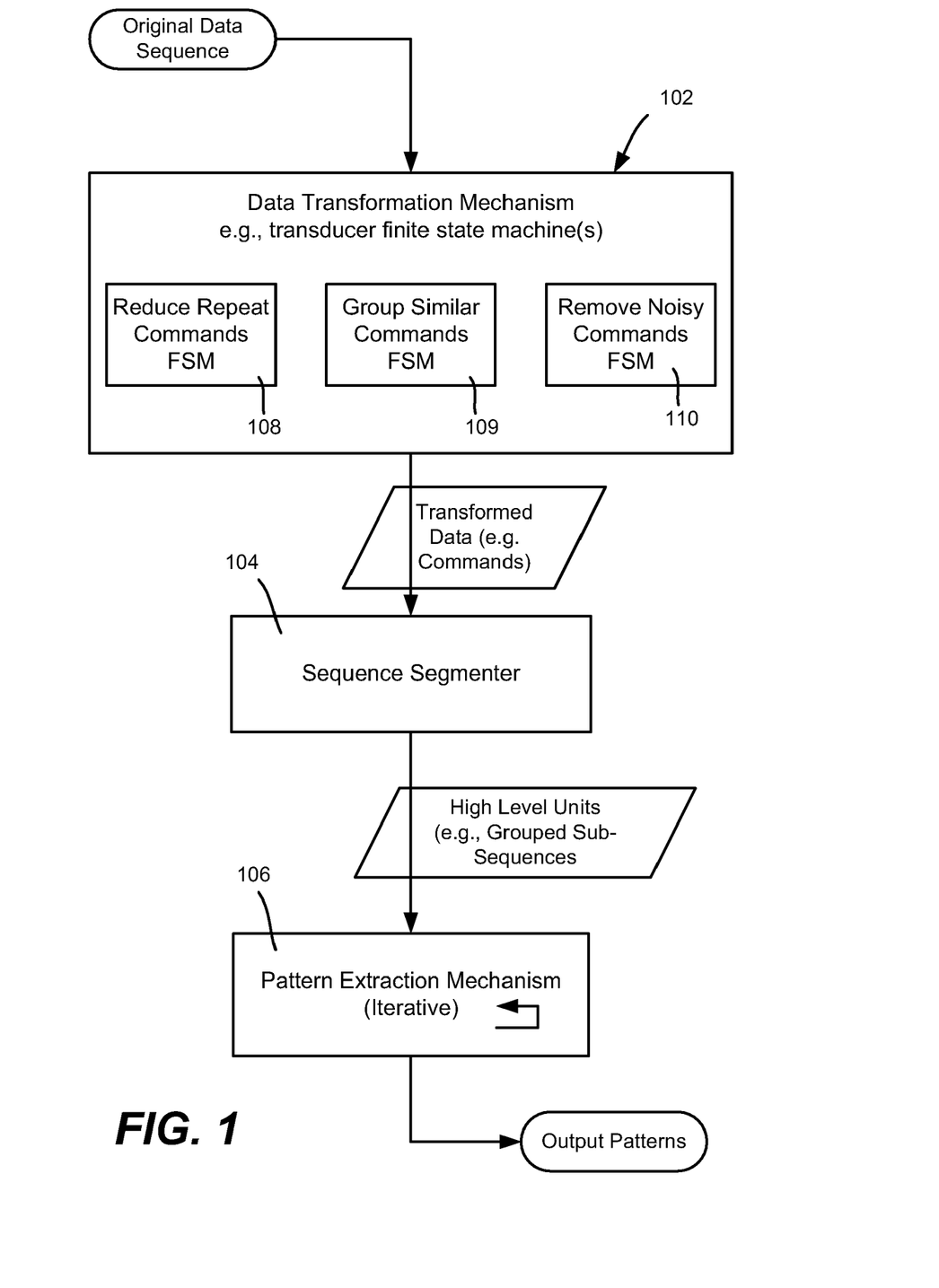
FIG. 1 is a block diagram showing example components for extracting patterns in sequential data.

FIG. 1 shows various aspects related to pattern extraction, and in general includes a data transformation mechanism 102, a sequence segmenter 104 and a pattern extraction mechanism 106. By way of example, in Microsoft® Office, a seven-dimensional vector is recorded for each click in Office Ribbon applications. The vector includes the command ID, its parent command ID, control location such as Tab, Low ribbon, Quick Access Tab. These recorded clicks form a raw command sequence. However, an original sequence, such as a raw command sequence, may be noisy with respect to getting meaningful patterns.

As described below, in general, data transformation is performed data transformation with at least one transducer finite state machine (FSM). More particularly, data transformation to remove such noise is performed before extracting patterns. Because a proper data transformation process involves some human knowledge with respect to different data sources, a transducer finite state machine is chosen.

By way of example, the raw command stream is noisy, in part because there are many types of commands that appear within top patterns that are unused. For example, when select words in a document, a floating menu appears automatically for the selection, whereby two or three commands are recorded even though the user may not use any feature from the menu. Further, consider that navigation commands often appear in the same context, e.g., "Copy-PageUp-Paste" "Copy-PageDown-Paste" or "Copy-StartOfLine-Paste". Also, some commands are often used repeatedly: Delete, DeleteBackward, PageUp/PageDown, Zoom, and so forth.

As another example, there are a group of commands used for relocating the position of current cursor, referred to as "navigation commands". Navigation commands are often used in the same context, and it is more useful to treat such variations as the same usage pattern.

Another set of commands, like delete and navigation, are often used repeatedly. Patterns with the same commands repeated multiple times are in general useless for analysis purposes.

Figure 2:
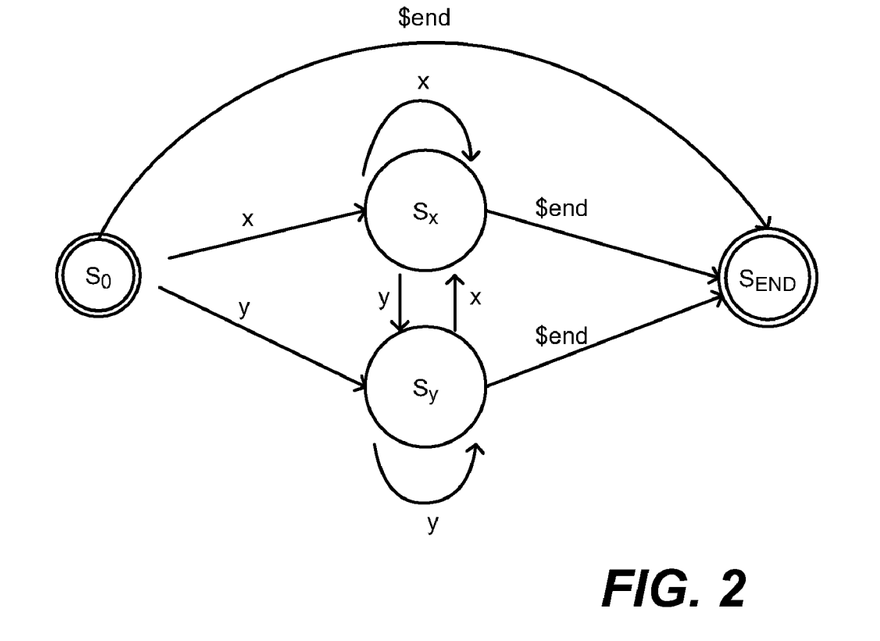
FIGS. 2 and 3 are state diagrams showing state machines for transforming sequential data as part of pattern extraction.
Figure 3:
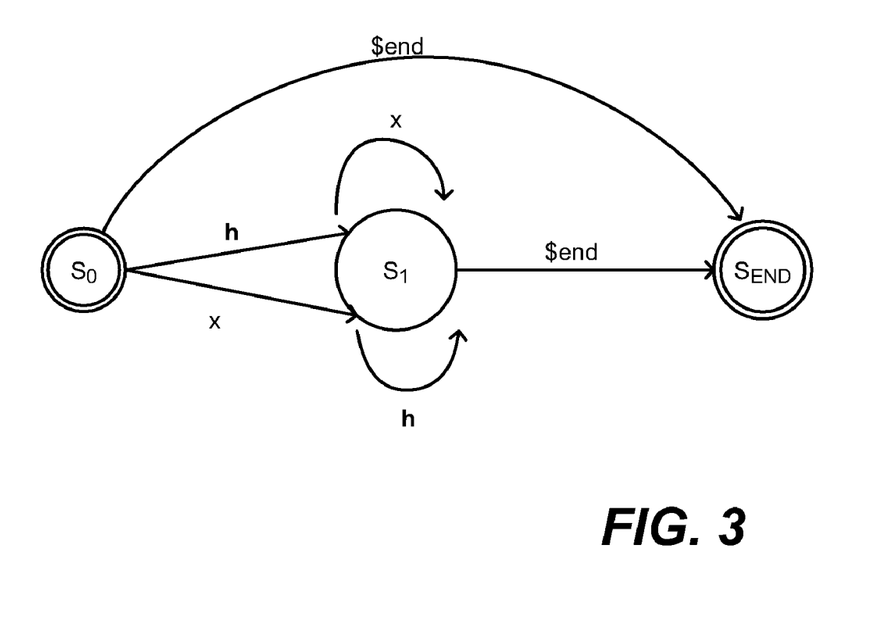

As represented in FIG. 1, different types of data transformations may be performed by corresponding finite state machines, as represented by the reduce repeat commands FSM 108, the group similar commands FSM 109 and the remove noisy commands FSM 110. Not all of these machines need be present in a given implementation, and others may be used instead of or in addition to one or more of those illustrated in FIG. 1. FIG. 2 represents the reduce repeat commands transducer FSM 108, while FIG. 3 represents the group similar commands transducer FSM 109 and/or the remove noisy commands transducer FSM 110.

To reduce repeated commands, it is noted that some commands are often used repeatedly. Mining patterns directly on raw sequences results in many patterns containing the same commands repeated different times; such patterns are normally useless. Therefore repeated patterns are collapsed into a new unit. To this end, suppose:

Σ is the input symbol set.
Γ is the output symbol set. Γ=Σ
∀x,y∈Σ,

FIG. 2 is a state diagram exemplifying the reduce sequential repeated commands FSM 108, given the transition relation:

| ω: (S₀, x) = x | ω: (Sₓ, x) = ε | ω: (Sᵧ, x) = x |
| ω: (S₀, y) = y | ω: (Sₓ, y) = y | ω: (Sᵧ, y) = ε |

To group similar commands, it is noted that some commands such as page-up, page-down, have similar usage behavior that normally does not need to be distinguished. Such commands are clustered as the same unit. Suppose:

Σ is an input symbol set.
H is a set of similar symbols. H ⊂ Σ
G is a universal symbol for H.
Γ is the output symbol set. Γ=X ∪ ε ∪ {G}−H
∀x∈Σ,∀h∈H.

FIG. 3 is a state diagram exemplifying the grouping similar commands FSM 109, given the transition relation:

| ω: (S₀, h) = G | ω: (S₁, h) = G |
| ω: (S₀, x) = x | ω: (S₁, x) = x |

To remove noisy commands, note that some commands are known to be automatically inserted, and they need to be filtered out. Suppose:

Σ is an input symbol set.
H is a set of symbols to be removed. H ⊂ Σ
Γ is the output symbol set. Γ=Σ∪ε
∀x∈Σ,∀h∈H.

FIG. 3 also shows a state diagram exemplifying the remove noisy commands FSM 110, given the transition relation:

| ω: (S₀, h) = ε | ω: (S₁, h) = ε |
| ω: (S₀, x) = x | ω: (S₁, x) = x |

In general, sequence segmentation via the sequence segmenter 104 segments the original sequence (following data transformation) into high level units in order to group similar sub-sequences together. In this way, more meaningful patterns are found. In one implementation, the sequence segmenter 104 incorporates a finite state machine that indentifies sub-sequences in the sequential data that have similar tree-like microstructures. In one implementation, the finite state machine operates by entering a path state when an input is a path command corresponding to a non-leaf node; the state machine remains in the path state until another command comprises an action command corresponding to a leaf node, whereby it outputs an action unit, or until the other command comprises a path command that is not the parent or the sibling of a next command, whereby a browsing unit is output. Additional details of one suitable sequence segmenter 104 are described in the aforementioned related U.S. patent application.

The pattern extraction mechanism 106 iteratively extracts stable patterns. More particularly, for a sequential data set X={x1, x2 . . . , xt}, which is generated by a unit set S={s1, s2 . . . , sN}, the mechanism 106 finds sequences of units which tend to appear together. To this end, the pattern extraction mechanism 106 computes a measurement of the stability of a pair of units:

$$WMI(S_i, S_j) = p(S_i, S_j) \log \frac{p(S_i, S_j)}{p(S_i)p(S_j)}$$

Once computed, the mechanism 106 iteratively identifies patterns with the max (WMI).

Figure 4:
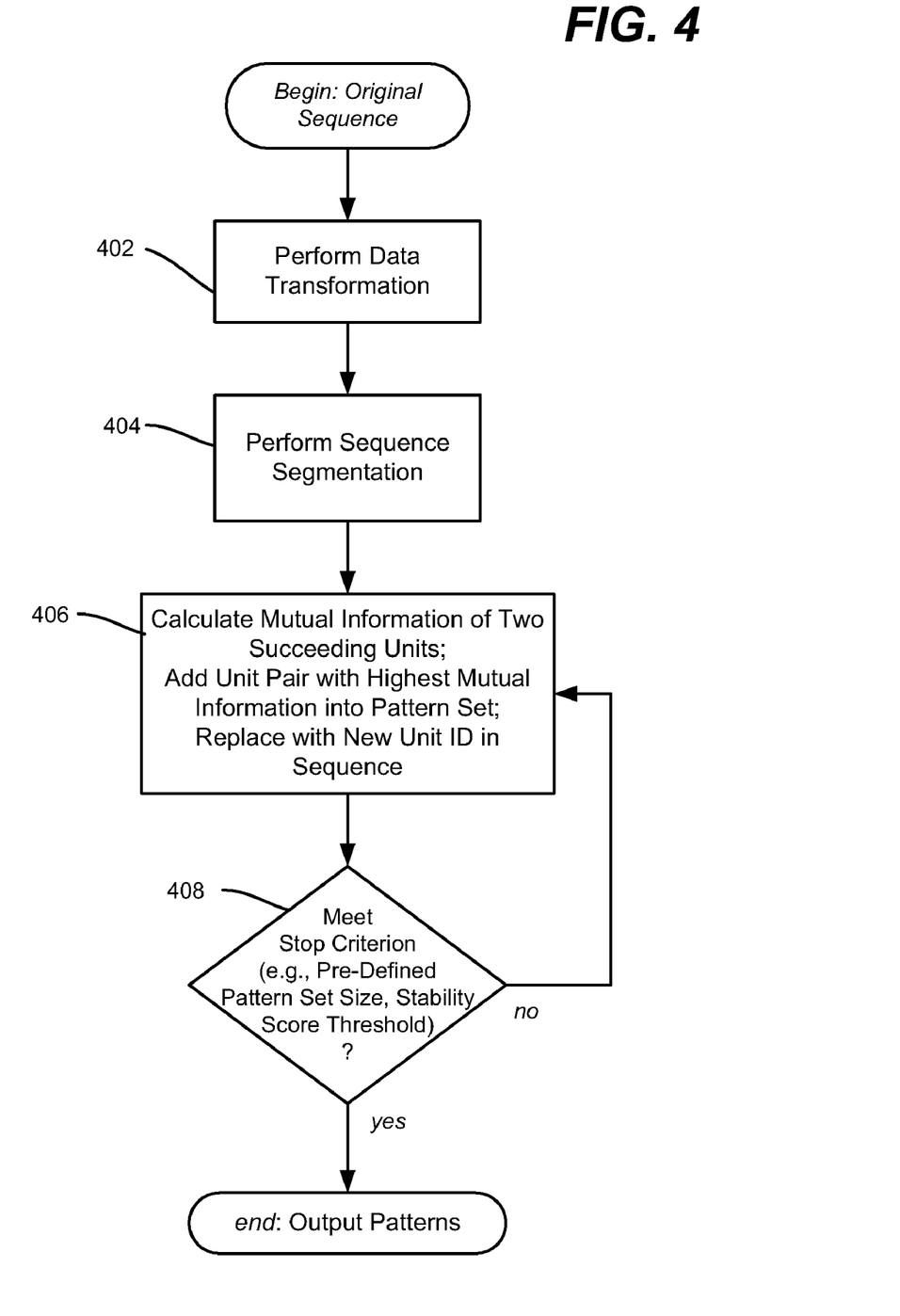
FIG. 4 is a flow diagram showing example steps taken to extract patterns from sequential data.

FIG. 4 is a flow diagram showing example steps for pattern extraction, following data transformation at step 402 and sequence segmentation at step 404. Note that in general, the mechanism 106 operates to find the most stable sequences of symbols, given a sequential data set X1 to Xt, which is generated by a symbol set S1 to Sn. In other words, for a sequential data set {x1, x2, . . . xt}, which is generated by a unit set {s1, s2 . . . sN}, find sequences of units that tend to appear together.

In one implementation, the stability between succeeding units are measured by weighted mutual information (WMI), as generally represented by step 406. In this process, the co-occurrence probability of two units is divided by their individual occurrence probabilities. The log of this item is the mutual information between them. The log item is then weighted by the co-occurrence probability.

As represented at step 406, two units with the maximum WMI are output as a pattern with a new unit identifier into a maintained pattern set. Via step 408, the process is carried on iteratively until a stop criterion is met, e.g., the pattern set reaches a pre-defined size, when the stability score is smaller than a pre-set threshold, and so forth. With such iterations, rather long patterns can be identified, as in the examples below, in which parentheses mark the iterations for generating these patterns:

(copy paste)
(delete (copy paste))
((copy paste) undo)
((((copy paste) undo) paste) delete)

Exemplary Operating Environment

Figure 5:
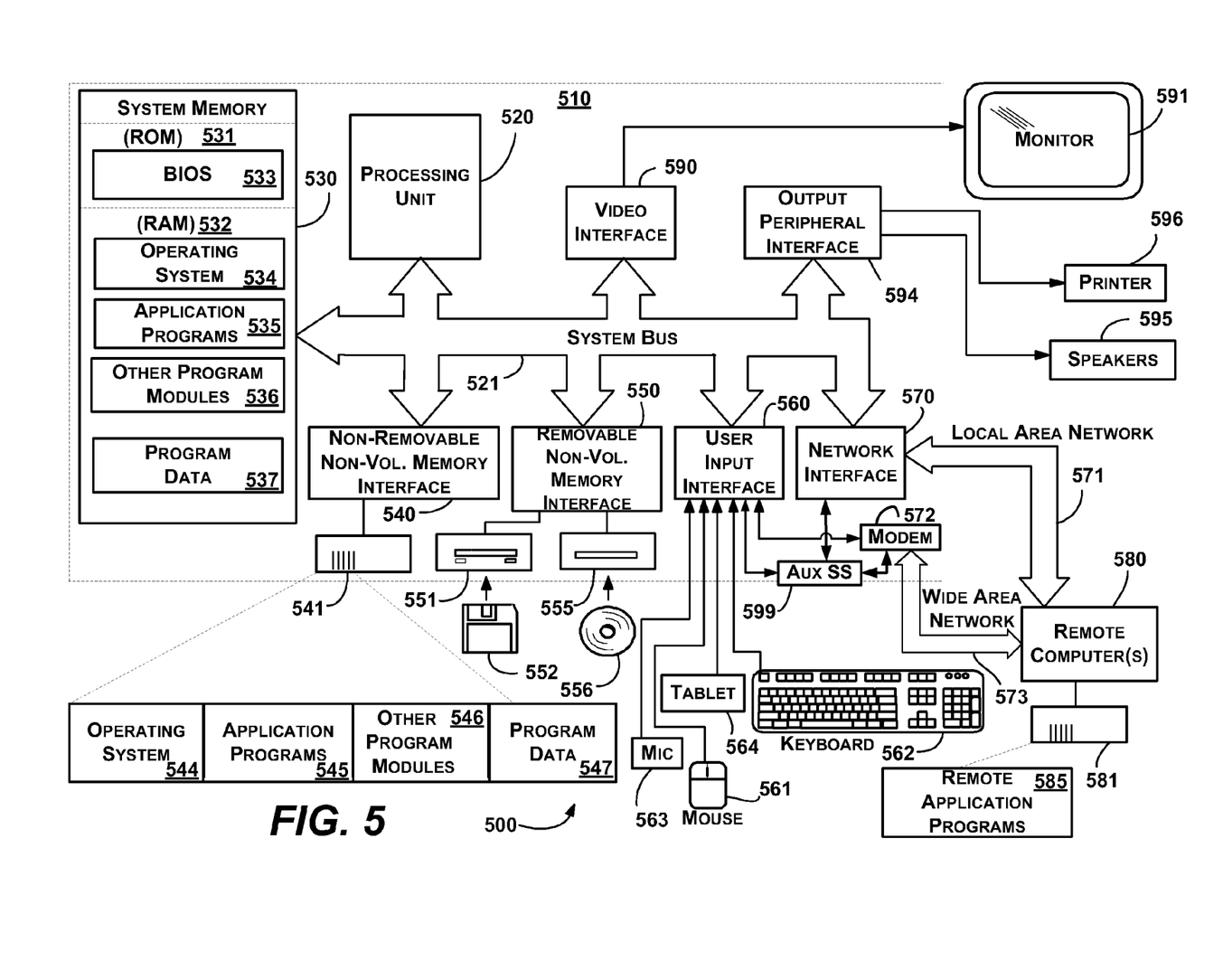
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method comprising:
receiving a raw stream of application program commands;
transforming the raw stream of application program commands into a transformed sequence of application program commands by:
reducing repeat application program commands in the raw stream of application program commands;
grouping some application program commands in the raw stream together; and
filtering out some noisy application program commands from the raw stream of application program commands;
segmenting the transformed sequence of application program commands into units of application program commands;
iteratively extracting stable patterns from the units of application program commands to identify stable pattern sets of frequently used combinations of application program commands, wherein the stable pattern sets are extracted by calculating weighted mutual information scores between succeeding units of application program commands; and
outputting at least some of the stable pattern sets of frequently used combinations of application program commands,
wherein at least iteratively extracting the stable patterns is performed by a processing unit.

2. The method of claim 1 wherein transforming the raw stream of application program commands comprises processing the raw stream of application program commands via at least one finite state machine.

3. The method of claim 1 wherein segmenting the transformed sequence of application program commands comprises grouping together similar sub-sequences into high level units.

4. The method of claim 1 wherein the stable pattern sets comprise a pair of units having a highest weighted mutual information score.

5. The method according to claim 1, further comprising reducing the repeat application program commands with a first finite state machine.

6. The method according to claim 5, further comprising grouping the some application program commands together with a second finite state machine that is different than the first finite state machine.

7. The method according to claim 6, further comprising filtering out the some noisy application program commands with the second finite state machine that is also used for the grouping.

8. One or more computer-readable memory devices or storage devices comprising executable instructions which, when executed by a processing unit, cause the processing unit to perform acts comprising:
receiving a raw stream of application program commands;
transforming the raw stream of application program commands into a transformed sequence of application program commands by at least one of:
reducing repeat application program commands in the raw stream of application program commands;
grouping some application program commands in the raw stream together; or
filtering out some noisy application program commands from the raw stream of application program commands;
segmenting the transformed sequence of application program commands into units of application program commands;
iteratively extracting stable patterns from the units of application program commands to identify stable pattern sets of application program commands, wherein the stable pattern sets are extracted based on mutual information scores between succeeding units of application program commands; and
outputting at least some of the stable pattern sets,
wherein the mutual information scores are calculated by dividing co-occurrence probabilities of the succeeding units by individual occurrence probabilities for the succeeding units.

9. The one or more computer-readable memory devices or storage devices of claim 8, wherein tree-like microstructures of sub-sequences of the application program commands are used for the segmenting.

10. The one or more computer-readable memory devices or storage devices of claim 8, the acts further comprising:
computing the mutual information scores.

11. The one or more computer-readable memory devices or storage devices of claim 8, wherein the mutual information scores are further calculated by taking logarithms of the co-occurrence probabilities divided by the individual occurrence probabilities.

12. The one or more computer-readable memory devices or storage devices of claim 11, wherein the mutual information scores are weighted mutual information scores calculated by weighting the logarithms by the co-occurrence probabilities.

13. A system comprising:
a data transformation mechanism configured to transform sequential data comprising application program commands into transformed sequential data comprising some application program commands from the sequential data;
a sequence segmenter configured to segment the transformed sequential data into units of application program commands;
a pattern extraction mechanism configured to extract patterns from the units of application program commands, the patterns reflecting sequences of the units that tend to appear together, wherein the patterns are extracted based on weighted mutual information scores of succeeding units; and
a processing unit configured to execute one or more of the data transformation mechanism, the sequence segmenter, or the pattern extraction mechanism.

14. The system according to claim 13, wherein the sequential data comprises a raw stream of application program commands.

15. The system according to claim 14, wherein the raw stream of application program commands comprises at least some navigation commands used for relocating a cursor.

16. The system according to claim 13, wherein the extracted patterns include at least the following sequences:
copy and paste;
delete, copy, and paste;
copy, paste, and undo; and
copy, paste, undo, paste, and delete.

17. The system according to claim 13, wherein the pattern extraction mechanism is configured to extract copy and paste commands during a first iteration and delete, copy, and paste commands during a second, subsequent iteration.

18. The system according to claim 13, wherein the data transformation mechanism is configured to group page-up and page-down commands in the sequential data together in the transformed sequential data.

19. The system according to claim 13 wherein the sequence segmenter comprises a finite state machine configured to perform the segmenting.

\* \* \* \* \*